Sept. 22, 1936.　　　P. A. MANGER　　　2,055,014
COUPLING FOR ROTATABLE ELEMENTS
Filed March 11, 1935　　　2 Sheets-Sheet 1
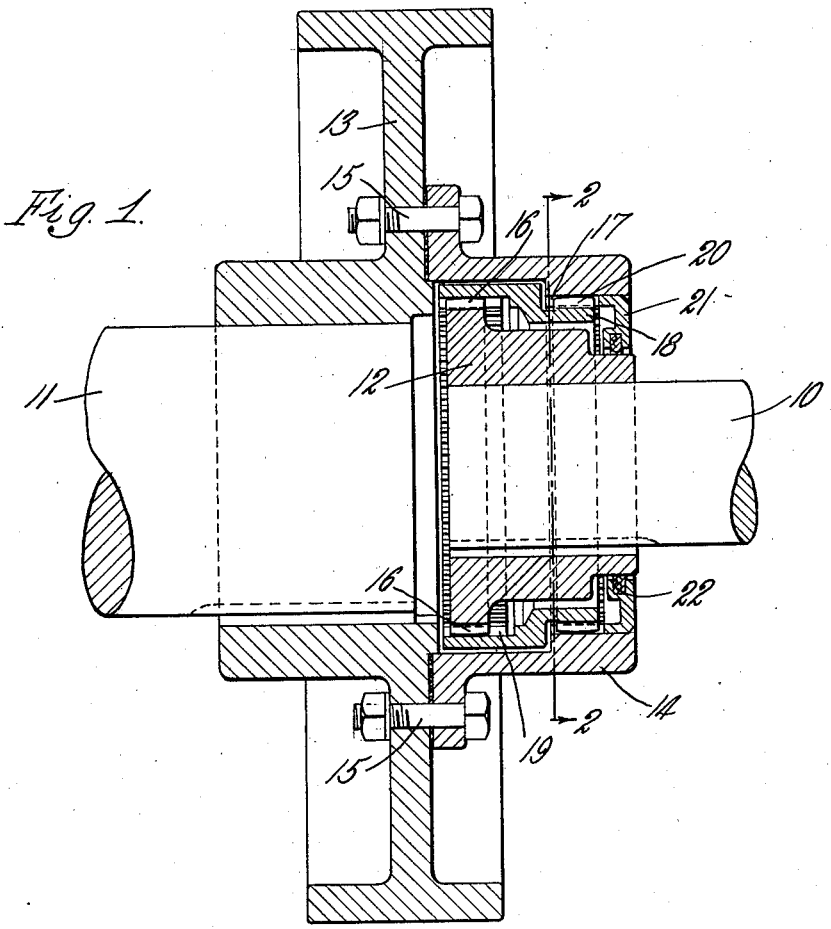
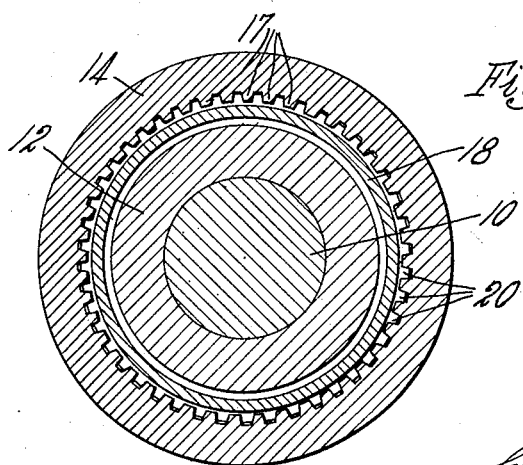
INVENTOR
Paul A. Manger
by Parker, Crochnow & Turner
ATTORNEYS Sept. 22, 1936.    P. A. MANGER    2,055,014
COUPLING FOR ROTATABLE ELEMENTS
Filed March 11, 1935    2 Sheets-Sheet 2

INVENTOR
Paul A. Manger
by Parker, Prochnow & Farmer
ATTORNEYS

Patented Sept. 22, 1936

2,055,014

UNITED STATES PATENT OFFICE 2,055,014

COUPLING FOR ROTATABLE ELEMENTS

Paul A. Manger, Eggertsville, N. Y., assignor to Farrel-Birmingham Company, Inc., Buffalo, N. Y.

Application March 11, 1935, Serial No. 10,471

4 Claims. (Cl. 64—9)

This invention relates more particularly to improvements in the double engagement gear tooth type of flexible couplings for rotatable elements which comprise a coupling sleeve or member provided with teeth or parts which intermesh or engage with complementary teeth or parts on the rotatable elements so as to positively transmit rotary motion from one element to the other, while nevertheless permitting relative movement between the coupling member and the coupled elements to allow limited axial adjustment and misalinement of said elements. The conventional couplings of this type comprise an outer coupling sleeve, usually made of separable parts, which surrounds the rotatable elements and is provided at one end with internal gear teeth meshing with external teeth on one element and at the opposite end with internal gear teeth meshing with external teeth on the other element. The intermeshing teeth are formed to cause positive rotation of the sleeve with the rotatable elements while permitting limited rocking movement of the sleeve relative to the elements and axial adjustments of the elements.

One object of my invention is to provide a desirable and efficient flexible coupling of a novel, simple and compact construction.

Other objects of the invention are to produce a novel, flexible coupling giving certain improved results and advantages, hereinafter appearing over previous couplings; also to produce a double engagement gear tooth coupling which is only approximately one-half of the length of conventional designs of couplings of this type; also to produce a double engagement gear tooth flexible coupling which allows misalinement and axial adjustment of the coupled elements while nevertheless maintaining the outer sleeve or casing of the coupling concentric or rigid with one of the rotatable elements; and also to provide a coupling having the other features of improvement and advantage hereinafter described and set forth in the claims.

In the accompanying drawings:

Fig. 1 is a longitudinal, sectional elevation of a coupling embodying my invention and illustrating one application of the coupling.

Fig. 2 is a transverse section thereof on line 2—2, Fig. 1.

Figure 3:
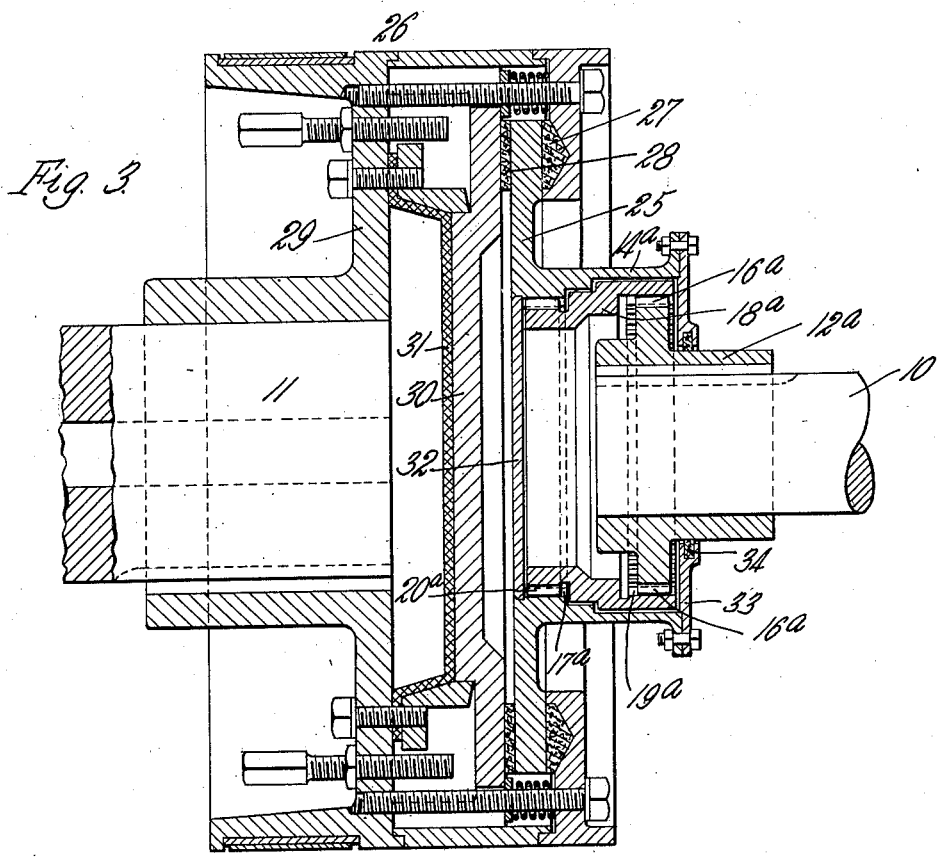
Fig. 3 is a view similar to Fig. 1, of a slightly modified embodiment of the invention, and illustrating a different application thereof.

Referring first to the Figs. 1 and 2 embodiment of the invention, 10 and 11 represent two rotatable elements to be coupled together end to end and either of which may be the driving element. As shown, the element 10 consists of a shaft having keyed or fixed thereon a gear wheel 12, and the other element 11 consists of a shaft having keyed or fixed thereon a wheel 13 provided with a hollow hub or sleeve 14 which may be rigidly attached to the wheel with an oil tight joint between the wheel and hub, as by bolts 15. This sleeve, which projects from one end of the wheel 13 surrounds the end of the shaft 10, and the wheel 12 thereon. The gear wheel 12 is provided with external gear teeth 16, and the sleeve 14 with internal gear teeth 17. A loose or floating coupling sleeve 18 surrounds the wheel 12 of element 10, between the same and the hub or sleeve 14, of the other element 11, and is provided at one end with internal gear teeth 19 which mesh with the external teeth 16 of the wheel 12, and at its opposite end with external gear teeth 20 which mesh with the internal teeth 17 of the hub or sleeve 14. The interengagement of the teeth of the coupling sleeve 18 with the teeth of the wheel 12 and hub 14 causes the latter and the element 11, of which it is a rigid part, to rotate with the element 10, or positively transmits rotary motion from one rotatable element to the other. However, the intermeshing teeth are so formed, for example, the external teeth 16 of the wheel 12 and the external teeth 20 of coupling sleeve 18 being crowned or convexed longitudinally, that the coupling sleeve is adapted to rock or assume angular relationships to the two elements 10 and 11, thus allowing limited offset and angular misalinement of the two rotary elements. Since the wheel 12 and the outer sleeve 14 are respectively rigid with the shafts or elements 10 and 11, they are integral parts of and may be considered as the coupled rotatable elements.

The outer sleeve 14 is shown as provided at its outer end with a cap or ring 21, which may be secured in the sleeve as by swaging or turning the inner edge of the sleeve over the outer edge of the ring, and the ring 21 carries, at its inner periphery, a suitable packing ring 22 contacting with the hub of the wheel 12. The cap 21 thus closes the outer end of the space between the wheel 12 and the outer sleeve 14 and forms a closed chamber for oil or lubricant for the intermeshing teeth of the coupling. Preferably the end of the coupling sleeve having the external teeth 20 is of smaller diameter than the opposite end of the sleeve, and the inner end of the outer sleeve or hub 14 is of sufficient internal diameter to allow the assembling and removal of the parts of the coupling through the inner end of the sleeve 14 after detaching the latter from the wheel 13.

By this embodiment of the invention, a small shaft or element can be coupled to a large element, such as a wheel or other member rigid with a large shaft. As shown, the overall diameter of the coupling in this construction is slightly larger than the diameter of the large shaft 11, but manifestly the coupling need not be any larger in diameter than the large shaft, and it may be even of smaller diameter than the large shaft. Obviously, the shaft 11 to which the outer sleeve 14 is fixed could be larger or smaller without changing in any respect the form and dimensions of the coupling. Thus, by the described construction, a small shaft can be coupled to a large shaft with a coupling of very much smaller diameter than would be required in a coupling of the conventional design, in which the coupled shafts or elements both extend into or are surrounded by the coupling sleeve which is angularly movable relative to the coupled elements. Furthermore, since the loose coupling sleeve 18 receives or surrounds the smaller rotatable element 12 and in turn is located within the surrounding outer sleeve 14, the length of the coupling is greatly reduced and need only approximate the length of the centrally disposed smaller element, the length of the coupling being only approximately half that of the conventional coupling of equal capacity.

Figure 4:
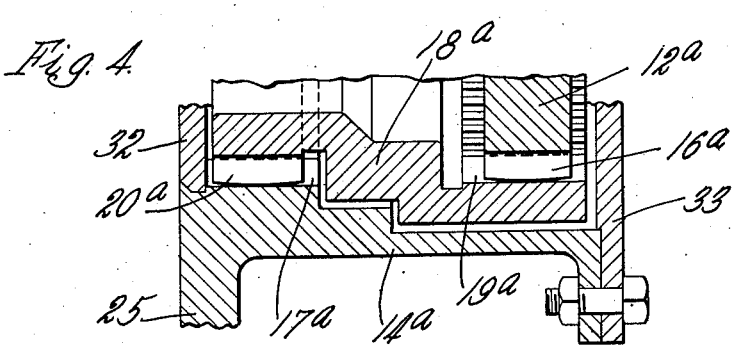
Fig. 4 is a fragmentary, longitudinal section, on an enlarged scale, of the coupling shown in Fig. 3.

As illustrated in Figs. 3 and 4, the coupling comprises members 12a, 14a and 18a, corresponding in function respectively with the members 12, 14 and 18 in the construction above described. As before, one rotatable element consists of a gear wheel 12a fixed to or formed on the shaft 10 and provided with external gear teeth 16a meshing with internal gear teeth 19a in one end of the loose coupling sleeve 18a, which latter is provided at its opposite end with external gear teeth 20a meshing with internal teeth 17a in the outer sleeve 14a. The teeth 16a and 20a, as before, may be longitudinally crowned or convexed to allow the coupling sleeve 18a to rock or assume angular relations to the elements 10 and 11. In this embodiment of the coupling, the outer sleeve 14a is formed integrally with or fixed on a disk 25 which constitutes one clutch member of a clutch, the cooperating clutch member of which is fixed to the other rotatable shaft or element 11, whereby one element can be caused to rotate with or allowed to rotate independently of the other element by the operation of the clutch. The clutch 26 shown is a pneumatic friction clutch of known construction in which the clutch disk 25 is positioned between opposing friction rings 27 and 28 carried by the clutch casing 29, which is keyed or otherwise fixed to the shaft 11. The friction ring 27 is carried by the fixed end wall of the clutch casing, and the other friction ring 28 is carried by a disk 30 which is moved axially in the clutch casing by pneumatic pressure on the flexible clutch diaphragm 31 for gripping the disk 25 between the clutch rings 28 and 27. The clutch may be of any other suitable construction in which a clutch member 25 fixed to the outer clutch sleeve 14a is adapted to cooperate with a clutch member 29 fixed to the shaft 11.

It is important in a clutch or analogous device of this sort that the clutch member 25 be always maintained in concentricity with and perpendicular to the axis of the element carrying the cooperating clutch member or members, and the flexible coupling described ensures these results, notwithstanding that the axis of the element 10 with which the member 25 rotates may be in offset or angular misalinement relative to the axis of the other element 11 and the cooperating clutch member or members. If the element 10 to which the clutch member 25 is coupled is out of alinement with the other rotating element or clutch member, the floating coupling sleeve 18a will automatically shift or adjust itself angularly relative to the axes of said elements to compensate for the misalinement thereof, so that the outer sleeve 14a and clutch member 25 will always remain concentric with and perpendicular to the axis of the cooperating clutch member or members.

As shown, the central chamber of the outer coupling sleeve 14a is closed at its inner end by a disk 32 which is secured to the coupling sleeve, as by swaging or turning the inner edge of the sleeve over the peripheral edge of the disk 32, and the opposite end of the chamber is closed by an end plate or cap 33 which may be bolted or otherwise secured to the coupling sleeve and carries at its inner periphery a suitable packing ring 34 surrounding and contacting with the hub of the wheel 12a. The chamber of the outer coupling sleeve thus forms a tight receptacle for oil for lubricating the intermeshing gear teeth of the coupling. The parts of this coupling are removable through the outer end of the sleeve 14a when the end plate 33 is removed.

While the part 25 of this coupling is illustrated and described as one member of a clutch, it will be apparent that this member 25 may be a member of a brake or other device which it is desired to maintain concentric with and perpendicular to the axis of the cooperating member of such brake or device.

In this construction, as in that first described, the floating sleeve of the coupling is arranged within or surrounded by one of the coupled rotating elements to which it is geared and, in turn, surrounds or receives the other rotatable element to which it is geared, so that both the length and diameter of the coupling are greatly reduced as compared with conventional double gear tooth couplings in which the floating coupling sleeve surrounds the two rotatable elements which it couples together. The overall diameter of the outer sleeve is in no wise dependent upon the diameter of the element to which it is attached, and the outer coupling sleeve may be either of smaller or larger diameter than its attached rotating element, which is not possible in previous constructions without greatly increasing the length of the coupling. In both of the constructions described the relation of the intermeshing teeth and associated parts is such as to also allow limited relative axial movement or adjustment of the rotatable elements.

I claim as my invention:

1. A coupling comprising two rotatable elements, and a coupling sleeve movable relatively to both said elements and having external gear teeth meshing with the internal gear teeth on one element, and internal gear teeth meshing with external gear teeth on the other element for transmitting rotary motion from one element to the other, and the intermeshing teeth of said sleeve and one element being spaced axially of the sleeve away from the intermeshing teeth of the sleeve and the other element, said coupling forming a holding chamber for a lubricant for said intermeshing teeth, and a circular sealed joint between said rotary elements for preventing escape of lubricant from said chamber, which joint is located radially inward from the circles in which the intermeshing teeth are located.

2. A coupling comprising a rotary driving element and a rotary driven element disposed with their axes of rotation in approximate end to end alignment, one of said elements having on the end facing the other element a tubular hub approximately concentric with its axis of rotation and telescoping over the adjacent end of said other element, the end of said hub into which said other element extends having an inwardly extending flange sealed against the adjacent part of said other element to provide an approximately lubricant-tight seal therewith, said hub having internal gear teeth between said flange and its other end, and the portion of said other element within said hub having external gear teeth spaced, in a direction along the axis of rotation of said hub, from the internal gear teeth of said hub, and a floating coupling sleeve entirely within said hub and surrounding said other element and having external gear teeth meshing with said internal gear teeth of said hub, and also having internal gear teeth meshing with said external gear teeth on said other element, whereby lubricant in said hub will be confined therein in contact with the meshing sets of gear teeth and held against escape by said seal.

3. The coupling substantially as set forth in claim 2 in which the pitch diameters of both sets of meshing gear teeth are greater than the diameter of the open end of said hub across said seal, whereby some of said lubricant will be held in the chamber of said hub even if said seal should leak.

4. The coupling substantially as set forth in claim 2 in which the external and internal gear teeth on said coupling sleeve have approximately the same pitch diameter.

PAUL A. MANGER.